Feb. 16, 1971  L. H. KINKELAAR  3,563,096
LIQUID SAMPLING APPARATUS
Filed May 12, 1969
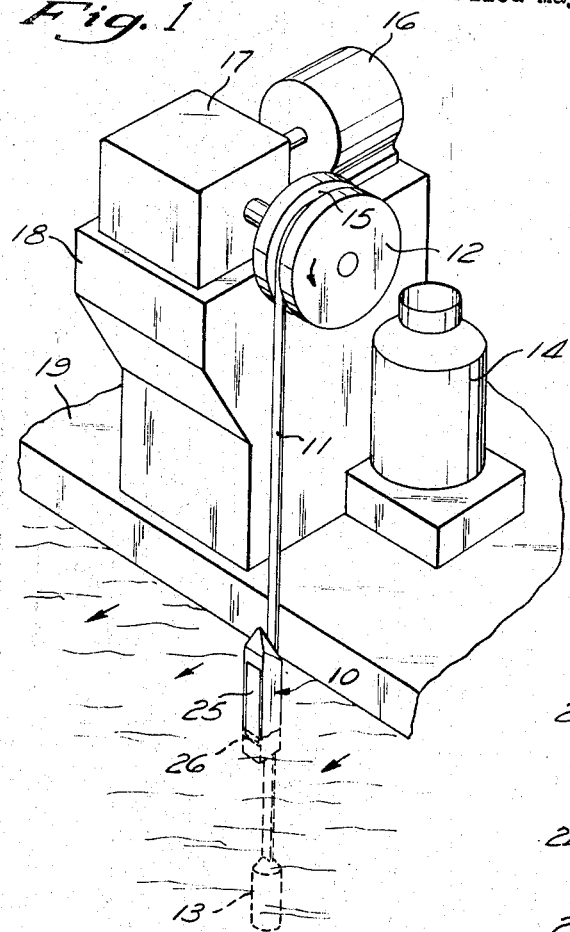
Fig. 1
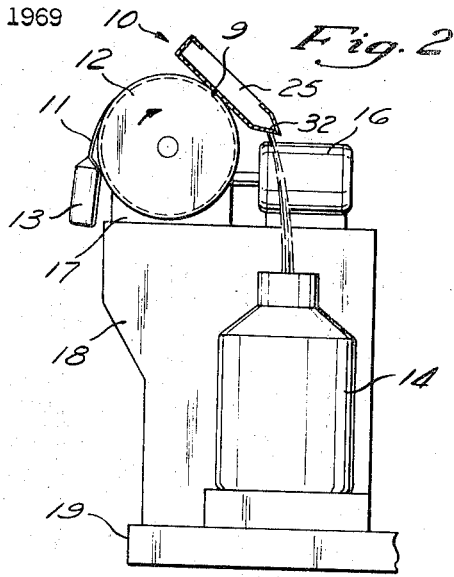
Fig. 2
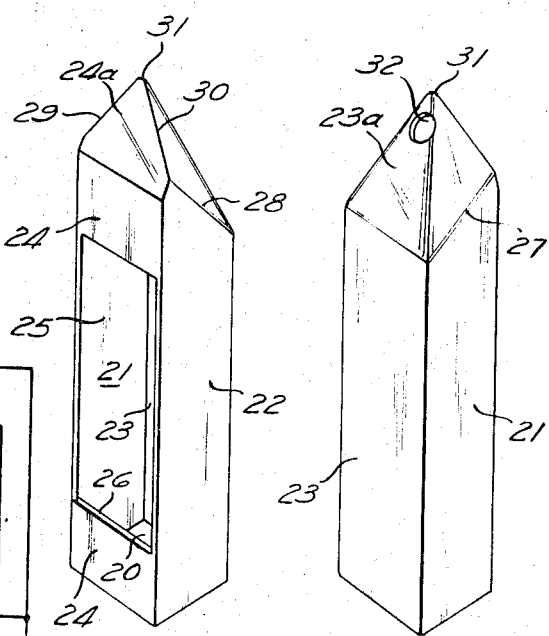
Fig. 3   Fig. 4
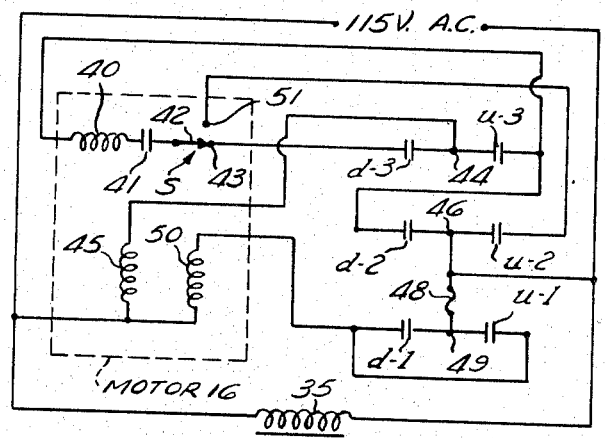
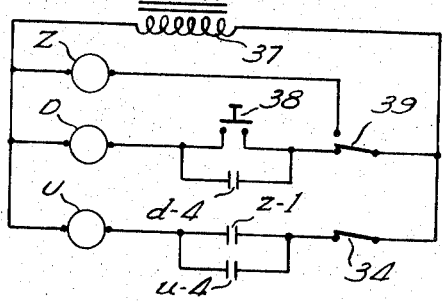
Fig. 5
INVENTOR.
LEONARD H. KINKELAAR
BY
ELY, GOLRICK & FLYNN
ATTORNEYS

United States Patent Office 3,563,096
Patented Feb. 16, 1971

3,563,096
LIQUID SAMPLING APPARATUS
Leonard H. Kinkelaar, 4007 Walter Ave.,
Parma, Ohio 44134
Filed May 12, 1969, Ser. No. 823,725
Int. Cl. G01n 1/12
U.S. Cl. 73—425.4            11 Claims

ABSTRACT OF THE DISCLOSURE

Liquid sampling apparatus having a sampling container suspended by a weighted ribbon from a motor-driven drum. The drum lowers the container to a sampling position, in which the container is upright and presents an inlet opening spaced appreciably above its bottom wall, and then raises the container to a discharge position, in which the container is inverted to spill the liquid sample out of a discharge opening at its upper end.

---

This invention relates to a liquid sampling apparatus which is particularly useful for taking samples of water from rivers or streams in order that the amount of pollutants in the water may be determined.

Prior to the present invention various arrangements have been proposed for taking from rivers or lakes samples of water which are then analyzed to determine the amount of pollutants in the water, so that the degree of contamination may be kept within permissible limits. The prior arrangements for this purpose have not been entirely satisfactory, particularly because of a tendency to become clogged by debris floating in the water. The present invention is directed to a novel apparatus which overcomes this and other problems encountered in the taking of water samples.

Accordingly, it is a principal object of this invention to provide a novel and improved liquid sampling apparatus which is particularly adapted for taking samples in flowing bodies of water which are subject to pollution.

Another object of this invention is to provide such an apparatus which has a novel arrangement for lowering a sampling container into the liquid and then raising the container out of the liquid and inverting the container to discharge the liquid sample into a receptacle for subsequent analysis.

Another object of this invention is to provide an improved sampling container of novel construction which minimizes the possibility of its becoming clogged by debris in the water being sampled.

Further objects and advantages of this invention will become apparent from the folowing detailed description of a presently-preferred embodiment with reference to the accompanying drawing in which:

FIG. 1 is a schematic perspective view of the present apparatus with the sampling container lowered to a position for taking a water sample;

FIG. 2 is an elevational view of the FIG. 1 apparatus showing the sampling container raised out of the water and inverted to spill the water sample into a receptacle;

FIG. 3 is a front perspective view of the sampling container in the present apparatus;

FIG. 4 is a back perspective view of this sampling container; and

FIG. 5 is a schematic simplified circuit diagram of the electrical control circuit for the present apparatus.

Referring first to FIG. 1, the present apparatus comprises a container 10 for collecting water samples, a corrosion-resistant flexible, metal ribbon or band 11 attached, such as by welding, to the back of the container 10 at a point 9 (FIG. 2) which preferably is located about midway along the container's height, and a rotatable drum 12 to which the upper end of the ribbon 11 is attached. A weight 13 is attached to the lower end of the ribbon 11. The drum is rotatable between the lowered position shown in FIG. 1, in which the container 10 is in the water to collect a sample, and the raised position shown in FIG. 2, in which the ribbon 11 has been wrapped around the drum and the container has been inverted to empty the water sample into a receptacle 14. The drum has a circumferential groove 15 for receiving the ribbon 11.

The drum 12 is driven by a reversible electric motor 16 through a gear reduction 17. This motor preferably is a known type of motor used for raising and lowering garage doors. The motor 16 and gear reduction 17 are supported by a stand 18 extending up from a suitable platform 19.

Referring to FIGS. 3 and 4, the preferred embodiment of the sampling container 10, shown there, is a generally rectangular structure having a flat bottom wall 20, upstanding, spaced, parallel, opposite side walls 21 and 22, an upstanding back wall 23 extending between the side walls, and an upstanding front wall 24 extending between the side walls parallel to the back wall. The front wall 24 has a vertically elongated, rectangular inlet opening 25 whose width is equal to the spacing between the side walls 21, 22. The bottom edge 26 of this opening is located a substantial distance above the bottom wall 20, so that the portion of the front wall 24 which is located below this opening constitutes a baffle of appreciable height extending up from the bottom wall. This baffle together with the corresponding portions of the side walls 21, 22 and the back wall 23 form with the bottom wall 20 in a liquid-receiving pocket within the container below the inlet opening 25 when the container is in its upright position, as shown in FIG. 1.

At its upper end the back wall 23 of the container has a generally funnel-shaped, tapered portion 23a which is inclined upwardly toward the front wall 24. This funnel-shaped portion 23a of the back wall is welded along the lines 27 and 28 to the inclined upper edges of the side walls 21 and 22, respectively.

At its upper end the front wall of the container has a tapered portion 24a which is inclined upwardly toward the back wall portion 23a and is welded to the latter along edges 29 and 30, which converge to a rounded tip at the extreme upper end of the container.

Just below the upper end tip 31 of the container its funnel-shaped back wall portion 23a has a discharge opening 32 (FIG. 4).

As shown in FIG. 1, the container 10 is lowered in an upright position into the water, with its bottom wall 20 downward, until the surface of the water is above the bottom edge 26 of the inlet opening 25. The back wall 23 of the container is at the upstream side of the flowing water, as indicated by the arrows in FIG. 1, so as to minimize the possibility that solid debris in the water might enter the container through the inlet opening 25. The container fills with water through the inlet opening 25.

Then the drum 12 is rotated counterclockwise from the FIG. 1 position to raise the container 10 out of the water, carrying with it a water sample trapped in its liquid-receiving pocket. As the container is kept upright while being raised out of the water, any floating debris that might have entered the container through the inlet opening 25 tends to flow back out with the water which spills out over the bottom edge 26 of the inlet opening as the water level within the container drops to or below this edge. The suspension ribbon is wrapped progressively around the drum 12 and it pulls the container 10 upward, maintaining the container upright until it reaches the drum. Continued rotation of the drum in this direction causes the container to be pulled upward around the drum and to be inverted about the attachment 9 of its back wall 23 to the ribbon 11 until it reaches the position shown in FIG. 2. Here the water sample in the container is spilled through the discharge opening 32 in the upper end of the container 10 into the receptacle 14, as shown in FIG. 2.

Referring to FIG. 5, the control circuit for the reversible motor 16 which drives the drum 12 includes a transformer having its primary winding 35 connected across a 115 volt, single phase A.C. power supply. Three relays, Z, D and U, are connected to be energized from the 24-volt secondary 37 of this transformer. Relay D, when energized, causes the motor 16 to be energized in a "forward" direction to lower the container 10 to the position shown in FIG. 1. Relay U, when energized, causes the motor 16 to be energized in the "reverse" direction to raise the container 10 to the position shown in FIG. 2. Relay Z controls the initial energization of relay U following the deenergization of relay D, as explained hereinafter.

Relay D is connected in series with a normally-open, push-button operated start switch 38 and the normally-closed contacts of a limit switch 39 across the transformer secondary 37. With limit switch 39 in its normal position, as shown in FIG. 5, the closing of the start switch 38 will complete an initial energization circuit for relay D. When initially energized in this manner, relay D closes a set of normally-open contacts $d-4$ in parallel with switch 38, thereby completing a holding circuit for relay D independent of the start switch 38.

Relay Z is connected in series with the normally-open contacts of limit switch 39 across the transformer secondary 37.

Relay U is connected in series with a set of normally-open contacts $z-1$ of relay Z and a normally-closed limit switch 34 across the transformer secondary 37. Relay U has a set of normally holding contacts $u-4$ connected across contacts $z-1$.

The motor 16, which is designated in its entirety by the dashed-line enclosure in FIG. 5, has a starting winding 40 connected in series with a capacitor 41 to the mobile contact 42 of a reversing switch S, which is inertia-operated by motor 16 in a known manner each time the motor stops.

When the motor is stopped and the container 10 is in its raised position, the mobile contact 42 engages a fixed contact 43 of switch S, as shown in FIG. 5. Switch contact 43 is connected through a set of normally-open contacts $d-3$ of relay D to a juncture point 44 connected to the upper end of a first energizing winding 45 in the motor. The lower end of winding 45 is connected to the left side of the A.C. power supply.

The right side of the power supply is connected through a junction point 46 and another normally-open set of contacts $d-2$ of relay D to the opposite side of the starting coil 40 from the capacitor 41.

Also, the right side of the power supply is connected through a fuse 48, junction point 49 and a normally-open set of relay contacts $d-1$ of relay D to the upper end of a second energizing winding 50 in the motor. The lower end of motor winding 50 is connected to the left side of the power supply.

The reversing switch S has a normally-open fixed contact 51 connected to junction point 46 through a normally-open set of contacts $u-2$ of relay U. Relay U also has a normally-open set of contacts $u-1$ connected in parallel with the contacts $d-1$ of relay D, and a normally-open set of contacts $u-3$ connected between junction point 44 and the opposite end of starting winding 40 from capacitor 41.

In the operation of this control circuit, assume that initially the container 10 is in the raised and inverted position shown in FIG. 2, at which time the reversing switch S associated with motor 16 will be in the condition shown in FIG. 5, and all of the relays D, Z and U will be de-energized.

When the operator closes the start switch 38 momentarily, relay D becomes energized and completes a holding circuit for itself by closing its $d-4$ contacts. Also, relay D closes its contacts $d-1$, $d-2$ and $d-3$. The starting winding 40 of the motor is energized to produce "forward" (container-lowering) rotation of the motor as follows: from the left side of power supply up through winding 45, the now-closed $d-3$ contacts, the now-closed contacts 42, 43 of switch S, through capacitor 41 and winding 40, and through the now-closed $d-2$ contacts to the right side of the power supply. Motor winding 50 is energized from the power supply through the now-closed $d-1$ contacts of relay D.

The motor continues to produce counterclockwise rotation of the drum until the drum has been turned a pre-determined amount from the FIG. 2 position to the FIG. 1 position. This pre-determined amount may be determined by a movable member, such as a screw or like conventional revolution "counting" means (not shown), driven from the motor, which after a pre-determined "forward" rotation of the motor operates the limit switch 39 to open its normally-closed contacts and close its normally-open contacts.

When this happens, relay D is de-energized and its contacts $d-1$, $d-2$, $d-3$ and $d-4$ open, the motor windings 40, 45 and 50 are de-energized to stop the motor 16, and relay Z becomes energized. The stopping of the motor operates the inertia switch S, so that its contacts 42 and 51 are now engaged.

When thus energized, relay Z closes its contacts $z-1$ to complete an intial energization circuit for relay U. Preferably, there is a sufficient time delay in the closing of contacts $z-1$, in response to the energization of relay Z, for the lowered container 10 (FIG. 1) to receive a water sample, as described. Relay U closes its contacts $u-4$ to complete a holding circuit for itself which is independent of relay Z and the "down" limit switch 39.

Relay U also closes its contacts $u-1$, $u-2$ and $u-3$ in the motor energization circuit. Motor windings 45 and 40 now are energized as follows: from the left side of power supply up through winding 45, the now-closed relay contacts $u-3$, and through starting winding 40, capacitor 41, the now-closed switch contacts 42, 51, and through the now-closed relay contacts $u-2$ to the right side of the power supply. It will be noted that the direction of energization of winding 40 with respect to that of winding 45 is the reverse of that described for the "forward" (container-lowering) energization of the motor. Consequently, the motor is now energized for "reverse" (container-raising) rotation. The remaining motor winding 50 is energized through the now-closed relay contacts $u-1$.

After a brief rotation of the motor in the "reverse" direction, the "down" limit switch 39 is returned to its normal condition, thereby de-energizing relay Z.

The motor continues to drive the drum 12 clockwise until it reaches the FIG. 2 position, as determined by a screw (not shown) driven from the motor. This screw opens the "up" limit switch 34 when the parts reach the position shown in FIG. 2. Consequently, relay U is de-energized and its contacts $u-1$, $u-2$, $u-3$ and $u-4$ re-open de-energizing the motor. When the motor stops the inertia switch S is operated again to connect its contacts 42, 43.

If desired, the cycle of lowering the container to collect a water sample and then raising and inverting the container to discharge the sample into the receptacle 14 may be initiated automatically by a timer, instead of by the manually-operated switch 38 as shown in FIG. 5.

Alternatively, this cycle of operation may be initiated by operating a radio-controlled relay instead of the manual switch 38. This relay may be energized periodically in accordance with the flow rate of the stream from which the water samples are being taken, or it may be energized at arbitrarily chosen times.

From the foregoing description it will be evident that the illustrated embodiment of this invention is particularly well-suited for the taking of samples from a body of water, with the complete cycle of operation, once started, being automatically carried out to completion. The construction of the sample-taking container 10 and the manner in which it is raised and inverted to empty out the water sample minimize the possibility of its becoming clogged with debris floating in the body of water from which the sample is taken.

It is to be understood that the present invention may be used for taking samples of other liquids to be analyzed, such as in a brewery or a paint shop, as well as for taking water samples, as described.

I claim:
1. A liquid sampling apparatus comprising:
a container having a bottom wall and side walls extending up from said bottom wall to provide a liquid-holding pocket above said bottom wall, said container having an inlet opening in one of said side walls spaced a substantial distance above said bottom wall for passing liquid into said pocket;
and means operable to lower said container, with its bottom wall downward, into the liquid to be sampled to receive liquid in said pocket through said inlet opening and operable thereafter to raise said container out of the liquid to be sampled and to invert the raised container about the side thereof which is opposite said inlet opening to spill the liquid out of said pocket.

2. Apparatus according to claim 1, wherein said container has a discharge opening at its upper end at the side opposite said inlet opening.

3. Apparatus according to claim 1, wherein the side of the container opposite said inlet opening toward its upper end tapers toward the wall with the inlet opening therein.

4. Apparatus according to claim 3 wherein the side of the container opposite the inlet opening has a discharge opening at its tapered upper end.

5. Apparatus according to claim 1, wherein said means to lower, raise and invert the container comprises:
a rotary member;
an elongated flexible suspension member attached to said rotary member and adapted to be wrapped around the latter, said suspension member being attached to the side of the container opposite said inlet opening;
and motor means for rotating said rotary member in one direction to lower said container into the liquid to be sampled and for rotating said rotary member in the opposite direction to raise said container and wrap said suspension member around said rotary member to a container-inverting position.

6. Apparatus according to claim 5, wherein said motor means is a reversible electric motor, and further comprising a first limit switch for reversing the motor when the container has been lowered a predetermined amount, and a second limit switch for de-energizing the motor when the container has been raised to said inverting position.

7. Apparatus according to claim 5, wherein said rotary member is a drum, and said suspension member is a flexible ribbon which at its upper end is attached to the drum and below its upper end is attached to said side of the container opposite said inlet opening therein.

8. Apparatus according to claim 7, and further comprising a weight attached to the lower end of said ribbon below its attachment to the container.

9. A liquid sampling container having a bottom wall and side, back and front walls extending up from said bottom wall, said front wall having an inlet opening therein whose bottom edge is spaced an appreciable distance above said bottom wall, and said back wall, at its upper end above said bottom edge of the inlet opening in the front wall, tapering toward said front wall, said container providing a discharge opening leading from its tapering upper end.

10. A liquid sampling container according to claim 9, wherein said tapering upper end of the back wall is generally funnel-shaped and said discharge opening is in said funnel-shaped upper end of the back wall.

11. A liquid sampling container according to claim 10, wherein said front wall has an upper end located above said inlet opening which converges toward said funnel-shaped upper end of the back wall.

References Cited
UNITED STATES PATENTS

| | | | |
|---|---|---|---|
| 1,466,920 | 9/1923 | Anderson | 73—425.4 |
| 1,947,592 | 2/1934 | Haller | 73—354X |
| 2,919,028 | 12/1959 | Janus | 33—126.4X |
| 3,267,737 | 8/1966 | Biebighauser | 73—423 |
| 1,494,631 | 5/1924 | Roberts | 73—421(B) |

FOREIGN PATENTS

| | | | |
|---|---|---|---|
| 235 | 1881 | Great Britain | 73—354 |

LOUIS R. PRINCE, Primary Examiner

D. M. YASICH, Assistant Examiner

U.S. Cl. X.R.

73—421